United States Patent
Barman et al.

(10) Patent No.: US 6,877,540 B2
(45) Date of Patent: Apr. 12, 2005

(54) APPARATUS FOR AUTOMATED MANUFACTURE OF WELDED FOAM STRUCTURES

(75) Inventors: Bruce G. Barman, Greensboro, NC (US); Larry DeMoss, Jamestown, NC (US)

(73) Assignee: Sealy Technology LLC, Trinity, NC (US)

( * ) Notice: Subject to any disclaimer, the term of this patent is extended or adjusted under 35 U.S.C. 154(b) by 0 days.

(21) Appl. No.: 10/792,196

(22) Filed: Mar. 3, 2004

(65) Prior Publication Data

US 2004/0188031 A1 Sep. 30, 2004

Related U.S. Application Data

(63) Continuation-in-part of application No. 10/402,612, filed on Mar. 28, 2003.

(51) Int. Cl.[7] .............................................. B32B 31/00
(52) U.S. Cl. ...................... 156/497; 156/527; 156/529; 156/530; 156/251; 156/515; 156/304.6; 156/308.6; 219/221; 219/244; 219/386; 219/521; 219/546
(58) Field of Search ........................... 219/221; 156/527

(56) References Cited

U.S. PATENT DOCUMENTS 3,571,559 A * 3/1971 Becker et al. .............. 219/243
3,741,416 A   6/1973 Bilbow
3,769,124 A   10/1973 Johnson
3,879,254 A   4/1975 Hay, II
4,044,715 A   8/1977 Urai et al.
4,175,998 A   11/1979 Hay, II et al.
4,368,093 A   1/1983 Hay, II
4,461,662 A   7/1984 Onishi
4,529,569 A   7/1985 Palau
4,533,423 A   8/1985 Johnson et al.
4,598,001 A   7/1986 Watanabe et al.
4,608,103 A   8/1986 Aldrich

FOREIGN PATENT DOCUMENTS

JP          5-278114     * 10/1993

* cited by examiner

Primary Examiner—Linda L Gray
(74) Attorney, Agent, or Firm—Roetzel & Andress

(57) ABSTRACT

An apparatus and device for fusing two or more foam components together by thermal welding, has an interface blade adapted for placement at an interface of foam components to be fused together, and a nozzle proximate to the interface blade for distributing a heated gas at the interface of the foam components. The nozzle may be located in a shroud proximate to the interface blade. An automated foam welding apparatus has a platform for supporting foam components or other components, a clamp for applying pressure to one or more of the foam components, and one or more welding heads mounted upon a track for translation proximate to the foam components to be welded together, the welding heads having an interface blade and a heated gas distribution nozzle, and optionally a trimmer for trimming excess material from one or more of the foam components. A hand-held foam welding device is also described.

27 Claims, 5 Drawing Sheets

Fig.6

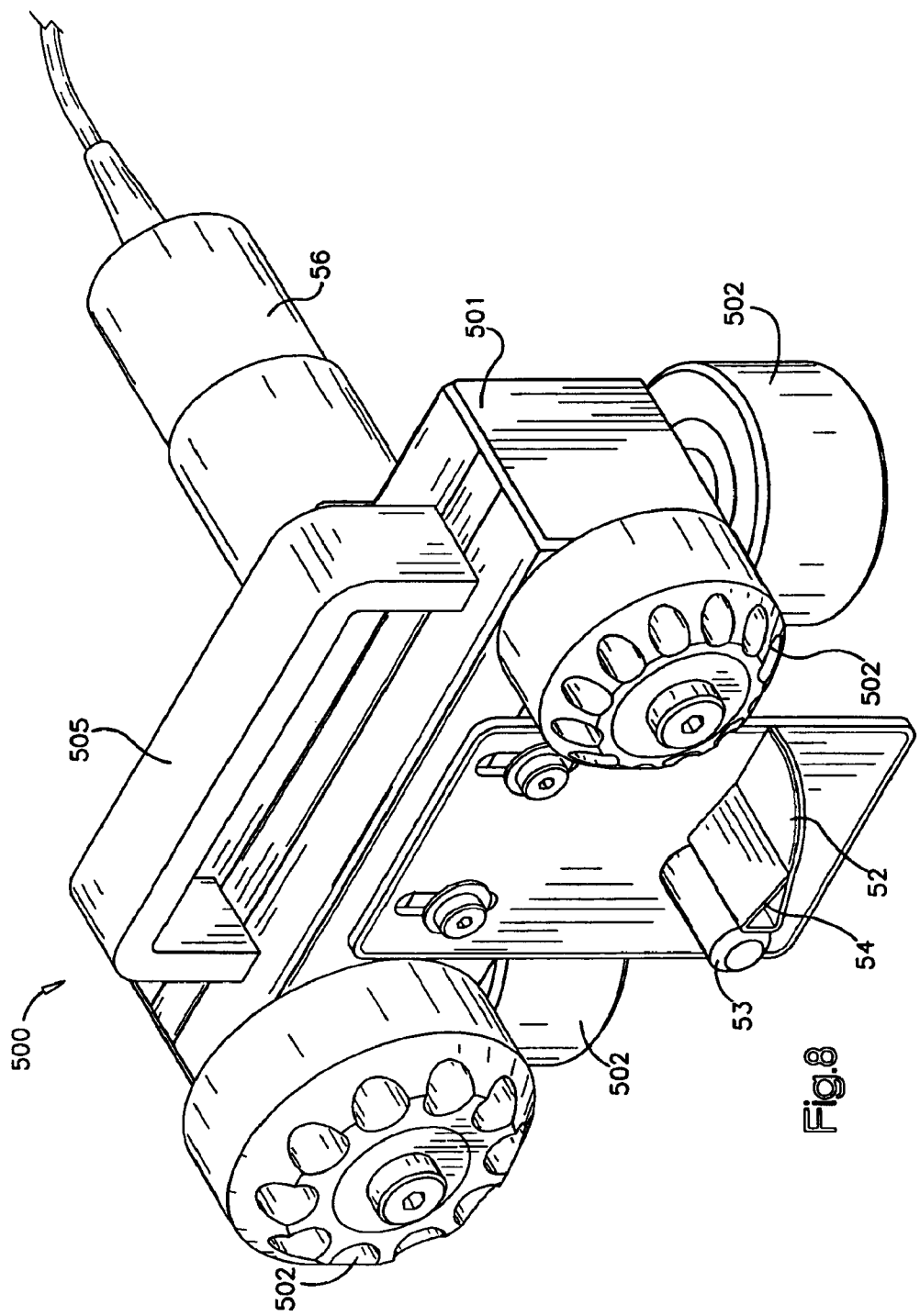

APPARATUS FOR AUTOMATED MANUFACTURE OF WELDED FOAM STRUCTURES

RELATED APPLICATIONS

This application is a continuation-in-part of U.S. patent application Ser. No. 10/402,612, entitled UNITIZED THERMOPLASTIC FOAM STRUCTURES, filed Mar. 28, 2003.

FIELD OF THE INVENTION

The present invention pertains generally to automated manufacturing, and more particularly to machinery and methods for automated manufacture of structures and products made of foam or other weldable materials.

BACKGROUND OF THE INVENTION

Industrial processing of foam material has advanced to the point of automated production of completed or ready-to-use foam components. Finished foam components are generally in the form of discrete structures which are then installed or otherwise integrated into a subassembly or final product. In products where two or more discrete foam components are to be combined, they are typically held together by a surrounding structure, or by an adhesive. Products which include multiple foam components with complex or differing shapes in multiple dimensions, are necessarily more difficult to assemble, and very difficult to automate the production thereof.

Co-pending U.S. patent application Ser. No. 10/402,612 describes a unitized thermoplastic foam structure which serves as a surrounding structure for an innerspring for a seat or mattress or other support device. Thermoplastic foam structures are unitized by thermal bonding or welding at the interfaces of discrete foam components. As explained in the related application, when thermoplastic foams are used, thermal bonding is preferred over the use of adhesive because the cost and application of the adhesive is eliminated. Thermal bonding however requires controlled application of a heat source at the interface of the foam components. While this can be done manually in various ways, an automated system would be preferable for manufacturing consistency.

SUMMARY OF THE INVENTION

The present invention provides an automated foam structure manufacture apparatus and method which performs the tasks of positioning and holding discrete foam components and forming welds or other types of bonds between the foam components. In accordance with one general aspect of the invention, there is provided an apparatus for manufacture of foam structures, the apparatus having a platform for supporting at least two foam components to be welded together; a foam component positioning mechanism for positioning a first foam component relative to a second component, and a foam welding head mounted to travel along an interface between the first and second foam components and operative to weld the first and second foam components together.

In another general aspect of the invention, there is provided an apparatus for manufacture of foam structures which includes a platform for supporting a first foam component and a second foam component in contact with the first foam component at an interface; a clamp for maintaining the second foam component in a position relative to the first foam component; and a welding head operative to weld the first foam component to the second foam component at the interface, the welding head having an interface blade and a nozzle configured to pass through the interface.

These and other general and more specific aspects, features, improvements and advantages of the invention are herein described in particular detail with reference to the accompanying drawings.

DESCRIPTION OF THE DRAWINGS

In the Drawings:

FIG. 8 is a perspective view of an alternate embodiment of a foam welding apparatus of the invention.

DETAILED DESCRIPTION OF PREFERRED AND ALTERNATE EMBODIMENTS

Figure 1:
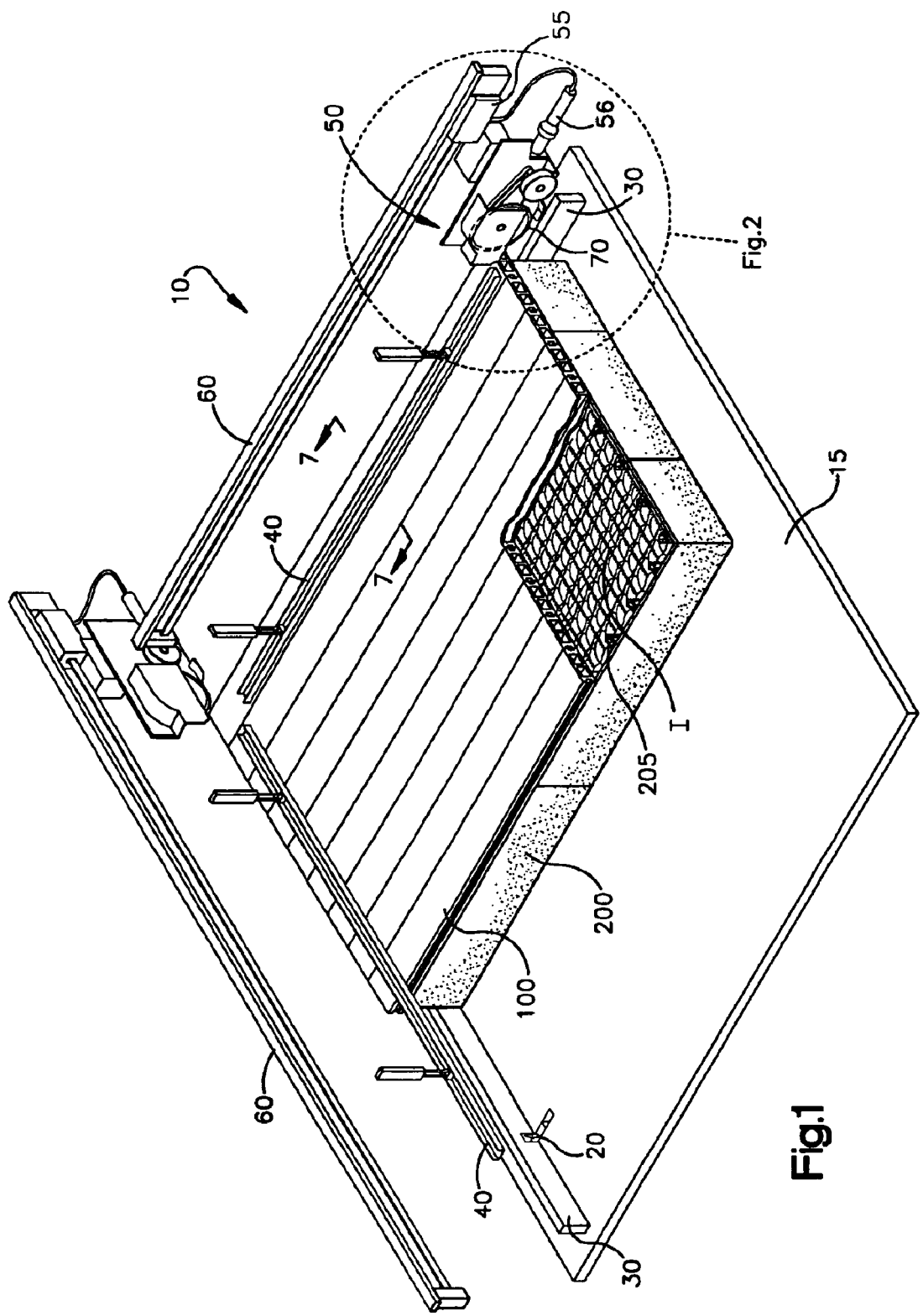
FIG. 1 is a perspective view of an automated foam structure manufacture apparatus of the present invention, in the production of a welded foam structure made of thermally welded discrete foam components.

FIG. 1 illustrates an apparatus for automated manufacture of foam structures, indicated generally at 10, which includes a platform 15 upon which one or more foam components, and other non-foam components if required, are placed during the welding process. The platform 15 provides a support surface for any components of a mattress or other device or product which includes foam pieces to be welded together by the foam structure manufacture apparatus 10. In the case of a mattress, one such internal component may include an innerspring assembly I, which may be in the form of interconnected wire coil type springs. Alternatively, the innerspring I may be in the form of pocketed or Marshall type coils wherein individual coils are contained within compartments of fabric or other flexible material and held in an array by such material. Alternatively, the innerspring may consist partially or entirely of foam, such as high density latex foam, about which other foam components are assembled as further described herein.

The platform 15 also serves as an initial staging or assembly area for components which are to be assembled with foam welded pieces. For example, as shown in FIG. 1, the innerspring I is placed on platform 15 in combination with one or more foam components which may be arranged proximate to the innerspring I, such as foam deck 100 overlying a major support surface defined by the co-planar ends of the springs of the innerspring I, or which may be pre-engaged with the innerspring, such as foam walls 200 which have flanges 205 which are engaged by the peripheral springs of the innerspring I. The following example of the claimed apparatus and method is made with reference to this particular combination of components to form a mattress or other flexible support structure, although it is understood that the concepts and principles of the invention are equally applicable to components and combinations of components of many other types, including the described automated fusing or welding of two or more foam components and in combination with other components or assemblies.

Figure 7:
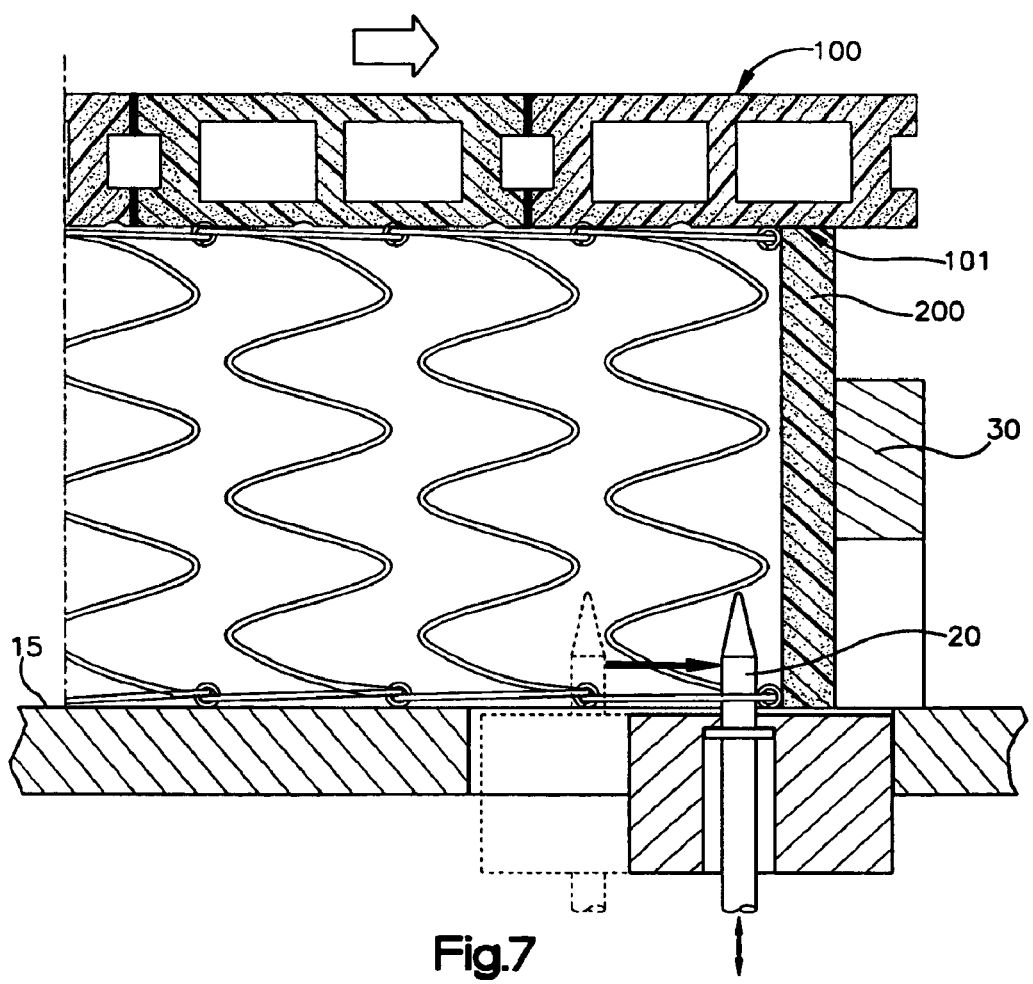
FIG. 7 is a side elevation view of a mattress innerspring and foam assembly in position upon a support structure of the foam structure manufacture apparatus of the invention.

With the foam deck 100 and foam side walls 200 so relatively arranged, and further in combination with the innerspring I, it is preferred to fixedly attach the foam deck 100 to the foam wall or walls 200 by a bond at the interface 101 of the components, as shown for example in FIG. 7. To hold the described components in tight alignment and registration, the apparatus 10 includes a component handling mechanism which engages the innerspring I and draws it tightly against rails 30, which for a mattress innerspring are in the form of two perpendicular rails 30 with vertical surfaces which face the mattress innerspring, but could be configured and positioned to receive components of various shapes. One example of a type of component handling mechanism operates in the following manner. With the springs S of the innerspring I exposed to the surface of platform 15, the innerspring I is engaged by translatable prongs 20 which are operative to project upward from the surface of platform 15 into the interior of the innerspring I and to bear against the wire of the proximate spring or springs S, and to translate laterally toward rails 30 thus drawing the innerspring I and any adjoining components such as walls 200 tightly against the rails 30. This is also referred to herein as a "gripping mechanism" or "gripper". The prongs 20 of the gripping mechanism can of course be differently configured for gripping or engagement with other types of components or objects. As shown in FIG. 7, the height of the rails 30 may be less than the height of the walls, so that the rails 30 do not interfere with the foam deck 100 which may extend beyond the walls 200 prior to trimming, as further described.

The interface 101 of the first and second foam components (foam deck 100 and foam side walls 200) is formed by the areas in which surfaces of the two components are in a face-to-face relationship, such as shown for example in FIGS. 4–7. In a particular interface region where a weld is to be formed, for example at the contact areas between the foam deck 100 and the edge of wall 200, it is preferable to holding the two adjoining foam components in position prior to and during the welding process. This is accomplished in one manner by a pressure bar or clamp 30 which is actuated to extend downward upon foam deck 100 over wall 200 to compress the two foam components together. The pressure which clamp 40 applies is set according to the amount required to maintain alignment and registration of the two pieces, and proximity for a weld to be formed at the interface.

Figure 2:
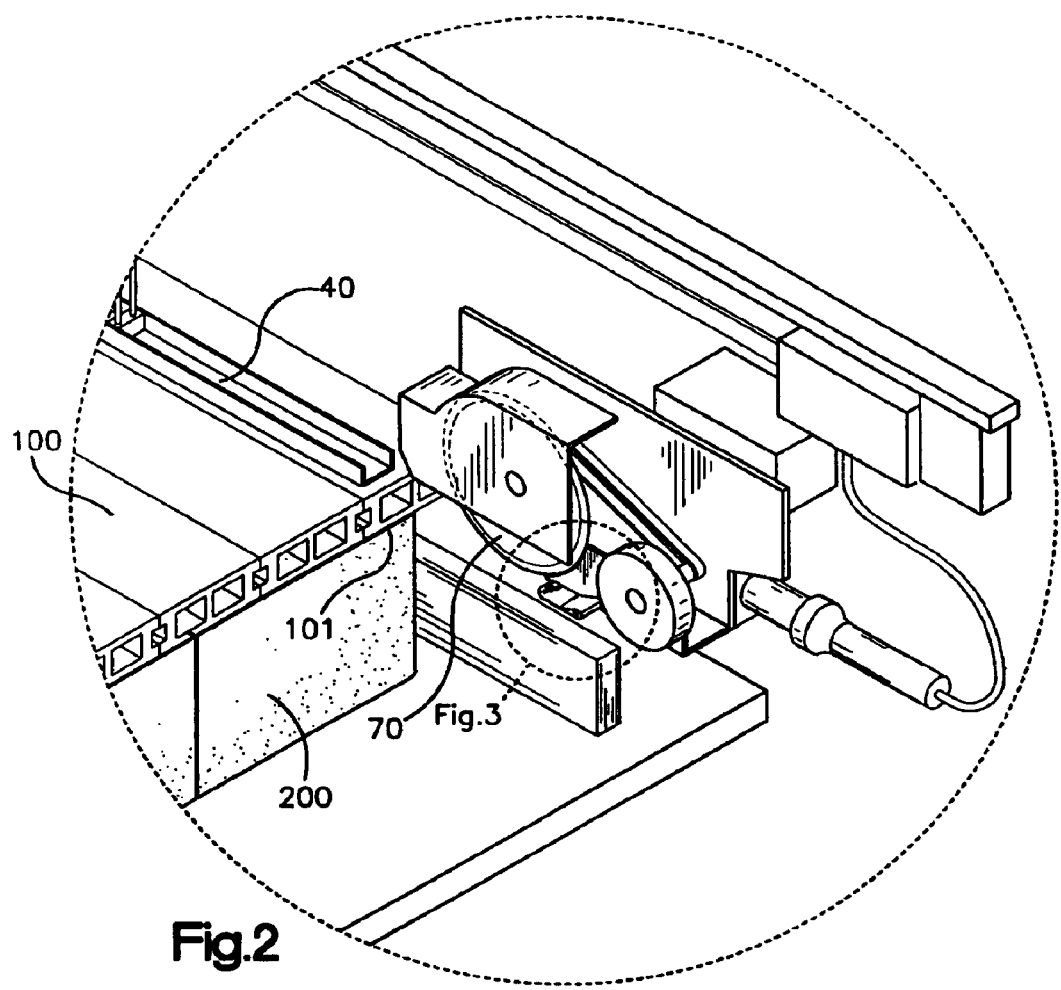
FIGS. 2 and 3 are detailed perspective views of a welding and trimming head assembly of the automated foam structure manufacture apparatus of the invention.
Figure 3:
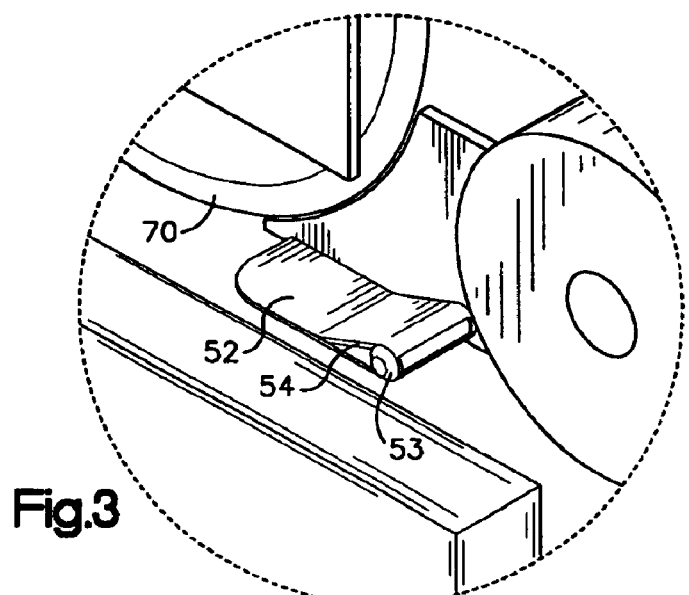
Figure 4:
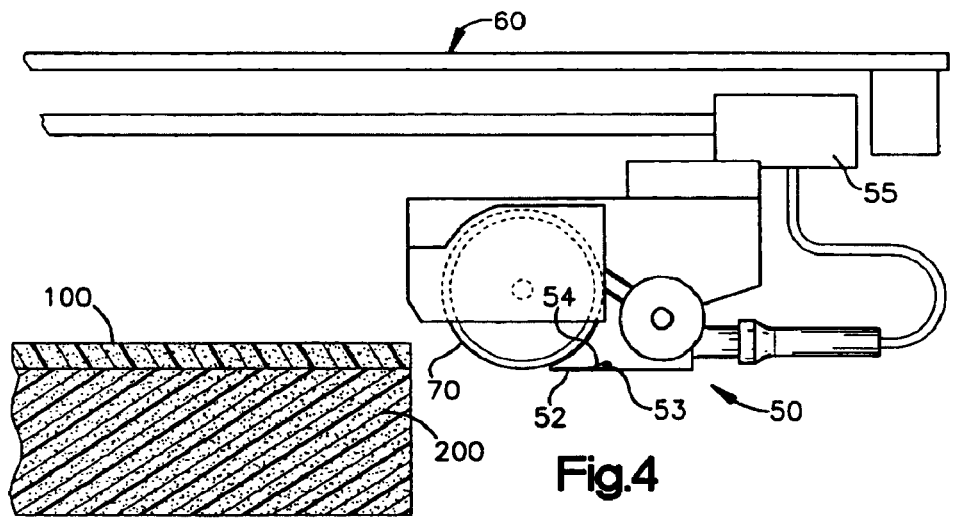
FIGS. 4 through 6 are side views of a welding and cutting head assembly of the automated foam structure manufacture apparatus of the invention.
Figure 5:
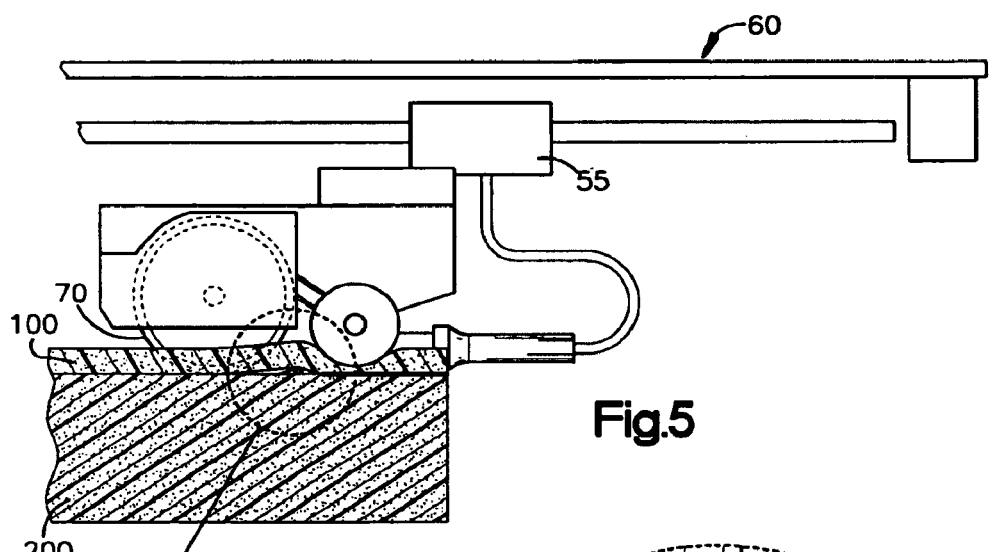
Figure 6:
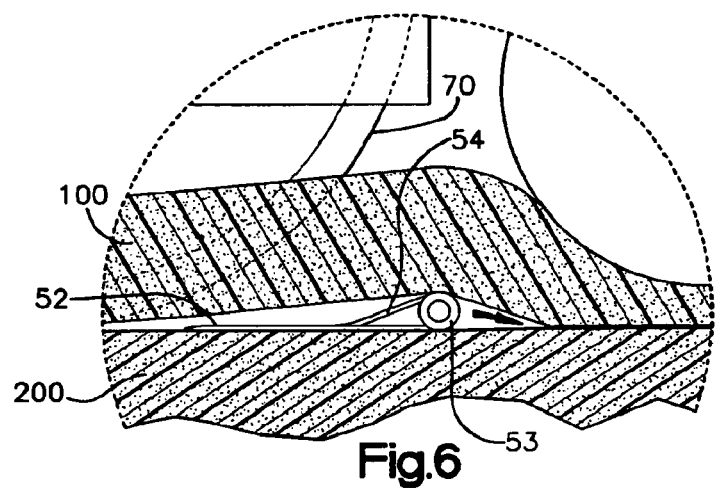

The apparatus 10 of the invention welds together foam components by applying heat along the interface 101. In one embodiment, the apparatus includes a welding head, indicated generally at 50 in FIGS. 2, 4 and 5, which is mounted to travel in a path proximate to the interface 101 to be welded, or proximate to rails 30 in order to operate upon the foam components proximate thereto. For example, the welding head 50 can be mounted to a linear actuator or bearing block 55 which is mounted for linear translation upon a track 60. The track 60 runs parallel to rails 30 and a corresponding edge of platform 15. The entire welding head 50 can be powered for linear movement along track 60, as for example by belt, chain or geared power to travel the length of track 60 and the length of an interface to be welded.

The welding head 50 includes an interface blade 52 configured to pass between two foam components at the interface. The interface blade 52 acts as a divider between the opposing surfaces of interface of the foam components as it travels along the interface of the foam components with the welding head. The interface blade 52 is shown in a horizontally oriented position, but can be positioned otherwise depending upon the particular orientation of the interface to be welded. Proximate to the interface blade 52 is a nozzle 53 positioned within a nozzle shroud 54 which extends from the interface blade 52. The nozzle 53 has one or more ports 55 which are oriented to direct hot welding gas, such as heated air, onto one or both of the opposed surfaces of the foam components. A welding energy source is provided through coupling 56 which may be, for example, an air heating element or other thermal device for delivery of heated air or other gas or gases to nozzle 53. The interface blade 52 and nozzle shroud 54 temporarily separates the two foam components at the interface 101 as hot air or other welding gas is directed onto the foam. The temperature of the welding gas or air is sufficient to put a surface layer of one or both of the foam components into a fluid state. Immediately upon the passage of nozzle 53, the foam components are re-compressed together under the pressure of clamp 40, as indicated by the leftward-pointing arrow in FIG. 6, thus creating a thermal weld between the components at the interface. The length of the nozzle 53 and nozzle shroud 54 can be selected to cover all or a part of the interface between two components. The nozzle and nozzle shroud may extend beyond an interface without consequence if there is no other material in the area which will be damaged by the heat of the welding gas. Also, the ports of the nozzle 53 can be oriented for optimal heat distribution at the interface of the opposing foam surfaces, as can the speed of travel of the welding head along track 60.

The apparatus 10 also performs a trimming function for excess foam material of one or both of the welded components. As shown in FIGS. 2–6, a trimming blade 70 is mounted to welding head 50 or to the bearing block 55 and is positioned to travel adjacent to an exterior surface of one of the foam components, such as the exterior vertical surface of wall 200 adjacent the foam deck 100. Any excess material of the foam deck 100 which overhangs the exterior vertical surface of wall 200 is removed by the blade 70 as it travels the length of the interface of these components. The trimming blade 70 can be of the rotary type as shown, driven by a rotary drive motor also mounted on the welding head or bearing block, or may be in the form of a straight or curved blade, heated, serrated or powered to reciprocate, as required or desired depending upon the type of material to be cut and the cutting rate required. Other types of cutting tools can also be utilized in accordance with this invention, including but not limited to hot wire cutters, lasers and water jets. All such devices and systems for cutting or trimming foam components are referred to herein as "trimmers".

As shown in FIG. 1, the described parts and systems of the welding apparatus 10 can be replicated and arranged in multiple dimensions in order to perform simultaneous welding operations on different areas of an article upon the platform 15. As shown, the rails 30 are arranged orthogonally to receive a rectangular mattress form at an intersection. Clamps 40 are provided with each rail 30 to maintain the mattress in position. A separate welding head 50 mounted on a corresponding track 60 is provided along each rail 30 to perform the welding operation at the interfaces along the corresponding side of the mattress. The separate welding heads 50 can be controlled to operate simultaneously whereby both of the edges at the corresponding rails 30 are simultaneously welded and trimmed. The welding heads 50 are thereafter controlled to return to the start positions shown in FIG. 1. This operation of the welding apparatus can of course be controlled by computer or other type of digital controller such as statistical process or programmable logic controllers as known in the art, and the automated control of the welding apparatus further integrated with other operations such as placement of the workpiece, including the foam components and any internal components on to, about or removed from the platform 15. Other operations, such as spot welding, gluing, fastening and other manufacturing operations can be performed simultaneously or in conjunction with the operation of the foam structure manufacture apparatus.

FIG. 8 illustrates an alternate embodiment of a foam welding apparatus of the invention which is used to fuse or weld together two or more pieces of foam material. In this embodiment, the apparatus 500 can be made as shown in a hand-held configuration with a body 501 to which are mounted one or more guides or rollers 502 for alignment and/or contact with foam components which are to be welded together. Although illustrated in the form of rollers, the guides 502 can alternatively be planar, angled or curved pieces with surfaces oriented to bear against a surface of a foam component proximate to an interface with another foam component where a weld is made. A coupling 56 is attached to the body 501 for delivery of a welding energy source to the apparatus, which as described can be heated air or gas or plasma material, to the delivery nozzle 53 shown projecting through or mounted to a mounting fixture 503 attached to body 501. The nozzle shroud 54 and interface blade 52 can also be mounted to fixture 503 as shown. Alternatively, the coupling 56 and nozzle 53 (and nozzle shroud 54 and interface blade 52) can be mounted directly to body 501 without any additional hardware or mounting fixtures. Any type of handle, such as handle 505 shown, can be attached to the body 501 for manipulation of the apparatus 500 along an interface of two or more foam components to create a weld therebetween. Alternatively, the body 501 can be configured as a grip for direct manipulation by a user.

In operation, the apparatus 500 is gripped by the user and positioned against the foam components to be welded, with guides 502 in contact with or bearing against one or more surfaces of the foam, and with the interface blade 52 positioned between opposing surfaces of the foam components. With a welding energy source such as heated air supplied to the coupling 56 and nozzle 54, the apparatus 500 is moved along a length of the interface to create a weld. External pressure can be applied to one or more of the foam components by hand or by other mechanism to facilitate formation of the weld or welds. The hand held version of apparatus 500 is particularly advantageous for creating welds along convoluted or intricate interfaces between foam components which require multiple turns and changes in position of the interface blade 52 and nozzle 54. Different sized interface blades 52 and nozzles 54 can be provided for different applications and best fit with the interface of the foam components. A cutting or trimming blade can also be attached to the body 501 with adequate shrouding for trimming one ore more of the foam components proximate to the weld.

What is claimed is:

1. An apparatus for manufacture of foam structures, comprising:
   a platform for supporting at least two foam components to be welded together;
   a foam component positioning mechanism for positioning a first foam component relative to a second component, and
   a foam welding head mounted to travel along an interface between the first and second foam components and operative to weld the first and second foam components together and a foam cutter operative to cut a portion of the first or second foam component proximate to a weld between the first and second foam components, wherein the foam cutter is located on the foam welding head.

2. The apparatus for manufacture of foam structures of claim 1 wherein the foam component positioning mechanism is operative to apply pressure to one of the first or second foam components relative to the other foam component.

3. The apparatus for manufacture of foam structures of claim 1 wherein the foam welding head comprises a blade which passes between the first and second foam components, and a heat source proximate to the blade.

4. The apparatus for manufacture of foam structures of claim 1 wherein the foam welding head is mounted and powered to travel a linear path along an interface between the first and second foam components.

5. The apparatus for manufacture of foam structures of claim 1 wherein the foam welding head is mounted and powered to travel a path proximate to the foam component positioning mechanism.

6. The apparatus for manufacture of foam structures of claim 1 further comprising a trimmer for trimming at least one of the foam components.

7. The apparatus for manufacture of foam structures of claim 6 wherein the trimmer comprises a cutting blade.

8. An apparatus for manufacture of foam structures, comprising:
   a platform for supporting at least two foam components to be welded together;
   a foam component positioning mechanism for positioning a first foam component relative to a second component, and
   a foam welding head mounted to travel along an interface between the first and second foam components and operative to weld the first and second foam components together and a foam cutter operative to cut a portion of the first or second foam component proximate to a weld between the first and second foam components, wherein the foam cutter is located on the foam welding head further comprising a gripping mechanism for gripping an internal component for combination with the first or second foam components.

9. The apparatus of claim 8 wherein the gripping mechanism comprises one or more prongs which project from the platform.

10. The apparatus of claim 9 wherein the one or more prongs are operative to move toward an edge of the platform.

11. An apparatus for manufacture of foam structures comprising:
    a platform for supporting a first foam component and a second foam component in contact with the first foam component at an interface;
    a clamp for maintaining the second foam component in a position relative to the first foam component;
    and a welding head operative to weld the first foam component to the second foam component at the interface, the welding head having an interface blade and a nozzle configured to pass through the interface, and a trimmer operative to trim one of the foam components, wherein the trimmer is mounted on the welding head.

12. The apparatus for manufacture of foam structures of claim 11 further comprising at least one gripper associated with the platform.

13. The apparatus for manufacture of foam structures of claim 11 further comprising a heated gas source connected to the nozzle of the welding head.

14. The apparatus for manufacture of foam structures of claim 11 further welding head is mounted upon a track for movement relative to one of the foam components on the platform.

15. The apparatus for manufacture of foam structures of claim 11 wherein clamp is configure to press one of the foam components against another of the foam components at an interface between the foam components to be welded together by operation of the welding head.

16. The apparatus for manufacture of foam structures of claim 11 further comprises a rail adjacent to the platform and the welding head.

17. The apparatus for manufacture of foam structures of claim 11 further comprises a heating element attached to the welding head.

18. The apparatus for manufacture of foam structures of claim 11 wherein the nozzle of the welding head comprises ports for directing heated gas to the interface of the foam components.

19. An apparatus for forming a weld between two separate foam components, the apparatus comprising:

a platform for supporting first and second foam components;

a rail proximate to the platform and located for positioning at least one of the foam components proximate to the rail;

a welding head mounted to translate upon a track generally aligned with the rail, the welding head having an interface blade positioned to travel between an interface of the two foam components, and a nozzle adapted to distribute a heated gas at the interface of the two foam components, and the second rail, a second track and a second welding head associated with the platform.

20. The apparatus of claim 19 further comprising a drive mechanism operative to drive the welding head along the track and along the interface of the foam components.

21. The apparatus of claim 19 further comprising a clamp operative to press one of the foam components against another of the foam componets.

22. The apparatus of claim 19 wherein the clamp is generally aligned with one of the rails.

23. The apparatus of claim 19 further comprising a trimmer operative to trim one of the foam components.

24. The apparatus of claim 23 wherein the trimmer is in the form of a circular rotating blade.

25. The apparatus of claim 19 further comprising a welding energy source coupler connected to the welding head.

26. The apparatus of claim 19 further comprising a gripping mechanism for gripping a component relative to the platform.

27. The apparatus of claim 26 wherein the gripping mechanism is in the form of one or more prongs operative to engage a component on the platform.

* * * * *